United States Patent [19]
Schmidt

[11] Patent Number: 5,992,117
[45] Date of Patent: Nov. 30, 1999

[54] COMPOSITE SIDEWALL PANELS FOR CARGO CONTAINERS

[75] Inventor: George A. Schmidt, Langhorne, Pa.

[73] Assignee: Strick Corporation, Fairless Hills, Pa.

[21] Appl. No.: 09/005,967

[22] Filed: Jan. 12, 1998

[51] Int. Cl.[6] .................................................. B62D 25/02
[52] U.S. Cl. ........................... 52/582.1; 52/520; 52/540; 52/585.1; 52/584.1; 52/794.1; 296/60; 296/181; 296/191
[58] Field of Search .......................... 52/520, 540, 585.1, 52/582.1, 794.1, 584.1; 296/29, 181, 191, 60

[56] References Cited

U.S. PATENT DOCUMENTS

| | | |
|---|---|---|
| 3,034,824 | 5/1962 | Schubach . |
| 3,393,920 | 7/1968 | Ehrlich . |
| 4,037,379 | 7/1977 | Ozanne . |
| 4,357,047 | 11/1982 | Katz . |
| 4,420,183 | 12/1983 | Sherman . |
| 4,455,807 | 6/1984 | Ehrlich . |
| 4,553,888 | 11/1985 | Crissy et al. . |
| 4,810,027 | 3/1989 | Ehrlich . |
| 4,904,017 | 2/1990 | Ehrlich . |
| 4,940,279 | 7/1990 | Abbott et al. . |
| 4,958,472 | 8/1990 | Ehrlich . |
| 5,286,079 | 2/1994 | Zubko et al. . |
| 5,439,266 | 8/1995 | Ehrlich . |
| 5,492,747 | 2/1996 | Kemp et al. . |
| 5,509,714 | 4/1996 | Schmidt . |
| 5,562,981 | 10/1996 | Ehrlich . |
| 5,664,826 | 9/1997 | Wilkens .................... 296/29 X |
| 5,774,972 | 7/1998 | Ehrlich . |
| 5,860,693 | 1/1999 | Ehrlich .................... 296/181 X |
| 5,876,089 | 3/1999 | Ehrlich . |

FOREIGN PATENT DOCUMENTS

| | | |
|---|---|---|
| 71023 | 12/1916 | Australia . |
| 521.697 | of 1921 | France . |
| 1233563 | 3/1959 | France . |
| 252395 | 10/1912 | Germany . |
| 354626 | 2/1919 | Germany . |
| 493308 | 6/1928 | Germany . |
| 1 064 228 | 5/1957 | Germany . |
| 40841 | 3/1934 | Netherlands . |
| 76894 | 11/1917 | Switzerland . |
| 383129 | 2/1932 | United Kingdom . |
| 492963 | 3/1938 | United Kingdom . |

*Primary Examiner*—Christopher T. Kent
*Attorney, Agent, or Firm*—Seidel, Gonda, Lavorgna & Monaco, PC

[57] ABSTRACT

A sidewall for a cargo container is provided having at least one pair of composite panels and means for joining the panels. Each composite panel includes a uniform facing member; a non-uniform facing member having major, minor and inclined portions; and a core member sandwiched between and bonded to the uniform facing member and the major portion of the non-uniform facing member. The uniform member is planar and has outer and inner surfaces. The non-uniform member has a planar major portion and a parallel minor portion which has outer and inner surfaces. The inner surface of the minor portion of the non-uniform member abuts the inner surface of the uniform member. The non-uniform member also has an inclined portion which connects the major and minor portions and which is angled with respect to the major and minor portions. Adjacent composite panels are joined within the offset formed by the abutting outer surface of the non-uniform member of one composite panel and the outer surface of the minor portion of the non-uniform member of the other composite panel.

15 Claims, 3 Drawing Sheets

COMPOSITE SIDEWALL PANELS FOR CARGO CONTAINERS

FIELD OF THE INVENTION

The invention pertains to trailers and other containers for moving cargo and, more particularly, to sidewalls for cargo containers comprising composite panels and means for joining the panels.

BACKGROUND OF THE INVENTION

Multi-panel constructions of the sidewalls of a trailer housing are known. A typical trailer 10 employing such construction is shown in FIG. 1. Such a trailer generally comprises a floor 14, a roof 16, a front wall 18, a pair of sidewalls 22, a rear cargo door (not shown), landing gear 24, and a wheel support assembly 26.

Each sidewall 22 and front wall 18 comprises a plurality of composite panels 12. Preferably, each composite panel is rectangular, having a height greater than its width. Although the composite panels are shown in FIG. 1 as being relatively equal in size, the width and thickness of each panel may vary.

FIG. 2 shows a prior art construction of a composite panel 12 and a method of joining or splicing adjacent panels to form the sidewalls 22 and the front wall 18. Composite panel 12 comprises a laminated sandwich including a plastic core 28 and aluminum face sheets 30 adhesively attached to each surface thereof.

As shown in FIG. 2, adjacent composite panels 12 are joined by means of an external aluminum splice plate 32 riveted thereto by vertical rows of rivets 34. The inside and outside wall surface of each panel are generally planar (i.e., lying in a plane), although the rivet heads 34 are shown as protruding.

In the construction of trailers and other cargo carriers, it is important to make available as much space as possible within the interior of the housing for the purpose of carrying cargo. In that regard, it is desired that the walls of the housing, in particular the sidewalls, be devoid of any obstructions.

It is desired to eliminate the spacer 32 at the edges of panels 12 and have the edges offset to enclose the plastic core 28. This would have the advantage of recessing the rivet heads below the inside surfaces of the panels to prevent the rivet heads from being peeled off by fork lifts or cargo. It also is desired to have the edges of the inside sheets curved inward so as not to be caught and torn by the fork lifts or cargo.

It is further desired to have a scuff plate interconnected to the inside of each sidewall 22 in a simple yet structurally sound manner to provide a relatively smooth surface facing the interior of the cargo container that will not entangle any cargo or equipment used to load or unload cargo. Such a scuff plate is disclosed in U.S. Pat. No. 5,509,714, which is herein incorporated by reference.

SUMMARY OF THE INVENTION

The present invention relates to a sidewall for a trailer or other cargo container comprising at least one pair of composite panels and means for joining the composite panels. Generally, the edges of the composite panels include offset portions to enclose the core material and to recess the joining means inward of the outer surfaces of the trailer or container. This offset, thus, serves to reduce or eliminate potential damage to the joining means by the fork lift or freight during loading and shipment.

In a preferred embodiment, each composite panel includes a uniform face member or surface; a non-uniform face member or surface having major, minor and inclined portions; and a core member sandwiched between and bonded to the uniform face member and the major portion of the non-uniform face member. The uniform member is planar and has outer and inner surfaces. The non-uniform member has a planar major portion which is positioned parallel to the uniform member and a parallel minor portion which has outer and inner surfaces. The inner surface of the minor portion of the non-uniform member abuts the inner surface of the uniform member. The inclined portion of the non-uniform member is angled with the major and minor portions. This construction forms a sandwich around the core and an edge which is stepped or offset inwardly at the minor portion of the non-uniform member. Preferably, two composite panels are positioned adjacent one another with the stepped edges overlapping. The pair of panels are joined at a point where the outer surface of the uniform face member of one panel abuts the outer surface of the minor portion of the non-uniform face member of the other panel. The joining means may comprise welding, rivets or the like.

The composite panels may comprise a pair of face members, each having a major portion and a minor portion, with an inclined portion connecting the major and minor portions. The inclined portion angles inwardly in forming the wall structure such that the inner surface of the minor portion of each outer member abut and there is a step or offset formed on each edge of the composite panel.

The sidewall constructions contemplated by the present invention may be combined with a scuff plate fastened to the bottom of the container and having an upward extending flange that protects the inside lower surface of the panels during the loading of cargo.

BRIEF DESCRIPTION OF THE DRAWINGS

For a better understanding of the present invention, reference is made to the accompanying drawings. The drawings show one embodiment of the invention as presently preferred and one alternative embodiment. However, it should be understood that the invention is not limited to the precise arrangements and instrumentalities shown in the drawings.

DETAILED DESCRIPTION OF THE INVENTION

Figure 1:
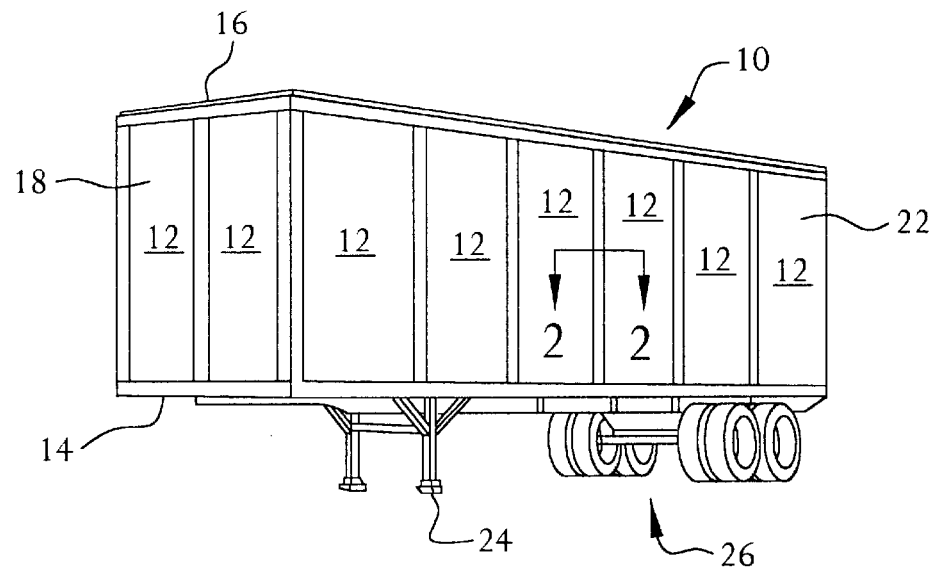
FIG. 1 is a perspective view generally showing a trailer, which is one type of cargo container that may incorporate the features of the present invention.
Figure 2:
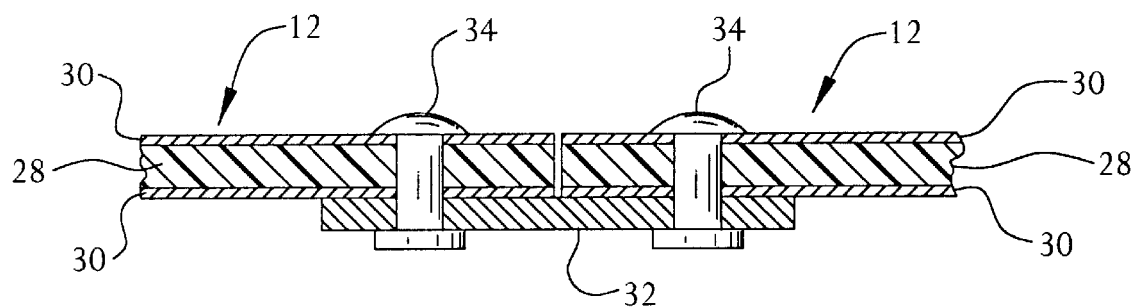
FIG. 2 is a partial cross-sectional view of a prior art composite sidewall construction as taken along line 2—2 in FIG. 1.

Referring to the drawings in detail, wherein like numerals indicate like elements and wherein the counterparts of such elements are designated by primes ('), there is shown in FIG. 1 a perspective view of a trailer 10. The present invention is not restricted to a trailer, but more broadly relates to the construction of cargo containers, including trailer bodies adapted to be hauled by tractor units. The terms "container" and "cargo container" are used interchangeably herein and each such term is meant to designate a partially-closed or closed, hollow structure for carrying cargo. The trailer 10, as illustrated in FIG. 1, includes provisions at the base thereof for a running gear 26 and a landing gear 24. The trailer 10 includes a roof 16, a floor 14, a front wall 18, a pair of sidewalls 22, and a rear cargo door (not shown). The trailer support assembly or running gear 26 is positioned adjacent the rear end of the trailer. The landing gear 24 is positioned forward of the running gear 26 and is used to support the trailer when a tractor is not attached.

Figure 3:
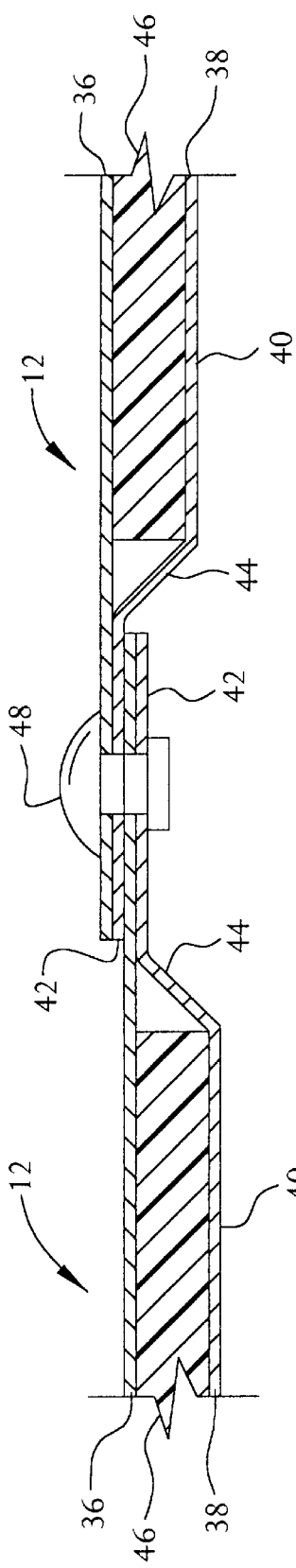
FIG. 3 is a partial cross-sectional view of a preferred embodiment of the sidewall construction of the present invention.

The trailer sidewall 22 includes a plurality of vertical upstanding composite side panels 12. Each composite panel has a predetermined length, height, width and thickness. In the embodiment shown in FIG. 3, each composite panel 12 includes a uniform face member or surface 36; a non-uniform face member or surface 38 having a major portion 40 and at each end or side edge a minor portion 42 and an inclined portion 44; and a core member 46. The core 46 is sandwiched between and preferably bonded to the uniform face member 36 and the major portion 40 of the non-uniform face member 38. The uniform member 36 is planar and has outer and inner surfaces. The outer surface forms the outer wall for the trailer and the inner surface is directly contacting the core 46. The major portion 40 of the non-uniform member 38 is positioned parallel to the uniform member 36 with the core 46 positioned therebetween. The minor portion 42 which has outer and inner surfaces is also parallel to the uniform member with the inner surface abutting the inner surface of the uniform member 36 at the edges. The inclined portion 44 connects the major and minor portions and is angled with respect to the major and minor portions. The inclined portion 44 and minor portion 42 of the non-uniform member 38 form a step or offset surface. By forming the sidewall panel 12 with a step, two adjacent panels may be attached to one another without a projecting edge on the inside surface of the sidewall 22.

Joining means 48 is provided at a point where the outer surface of the uniform member 36 of one composite panel 12 abuts the outer surface of the minor portion 42 of the non-uniform member 38 of the second panel. As illustrated, the joining means 48 is a series of rivets. The rivets (e.g., 3/16 rivets on 1" centers) are preferably positioned along the seam (i.e., the overlapping edges of the panels). Alternatively, seam welding or spot welding along the seam may be used.

Figure 4:
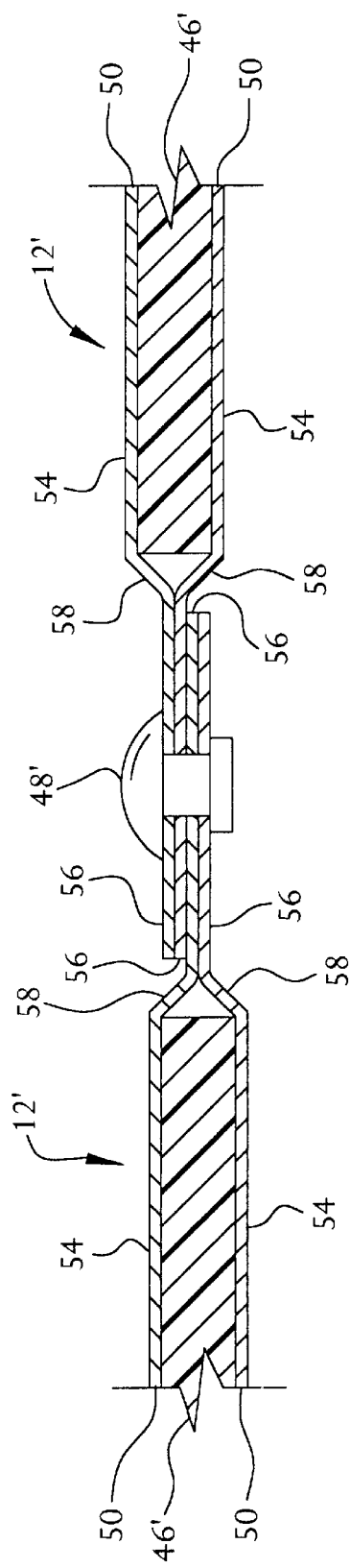
FIG. 4 is a partial cross-sectional view of another embodiment of the sidewall construction of the present invention.

FIG. 4 shows another embodiment, wherein the composite panels 12' comprise a pair of face members 50 and a core member 46' sandwiched therebetween. Each side edge of the face members 50 have a planar major portion 54 and a parallel minor portion 56, which have outer and inner surfaces. Each face member also has an inclined portion 58 connecting the major and minor portions. The core member 46' is positioned between the parallel major portions 54. The inclined portions 58 are angled with respect to the major and minor portions of each face member and form a step or offset on each side of the panels. The inner surface of the minor portion 56 of one member 50 abuts the inner surface of the minor portion 56 of the other member 50. The panels 12' are positioned adjacent one another and joined by joining means 48'. Again, the joining means may be rivets, welding, spot welding, etc.

Figure 5:
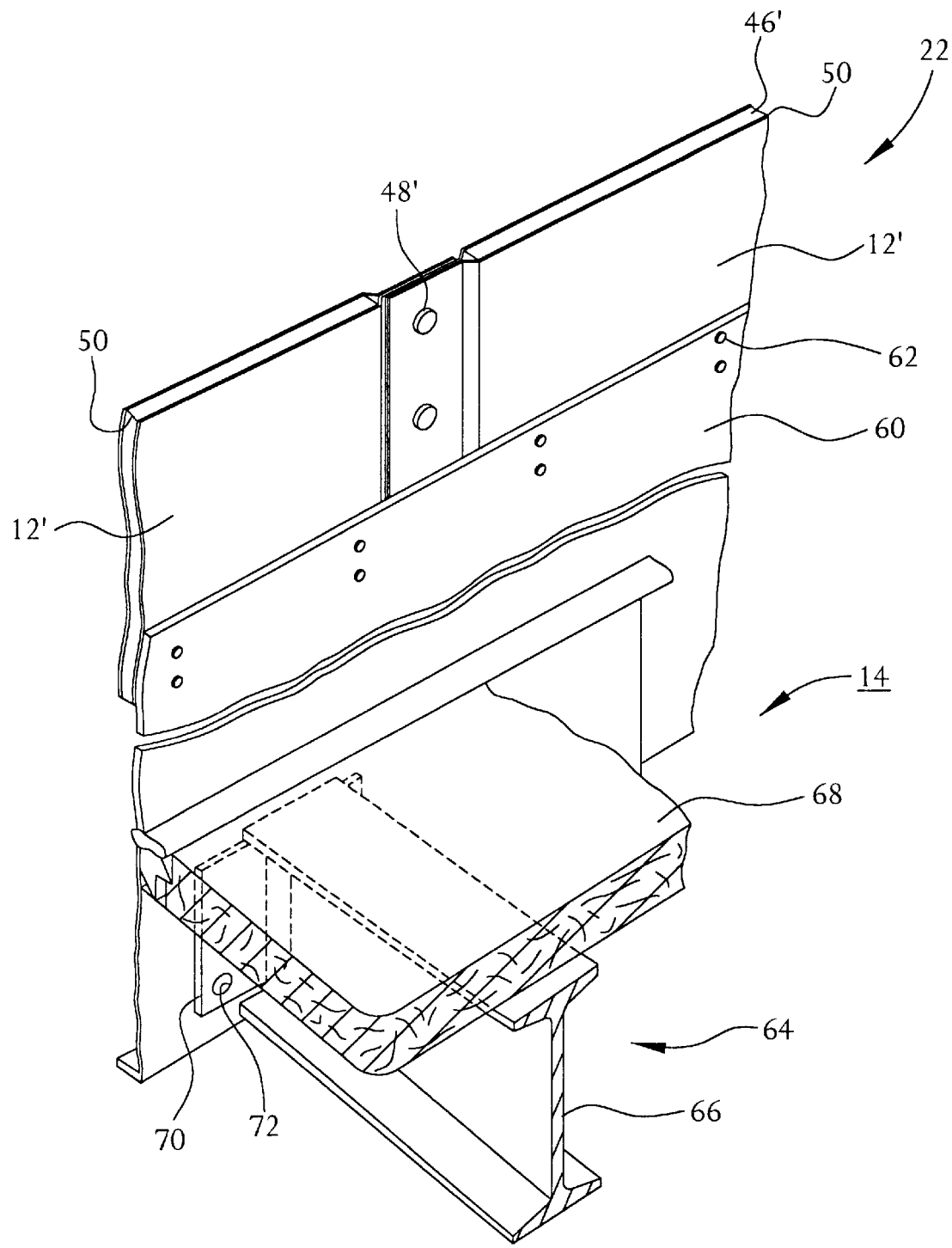
FIG. 5 is a partial perspective view of an embodiment of the sidewall construction of the present invention combined with a scuff plate and a floor assembly.

FIG. 5 shows the present invention combined with a scuff plate 60. The connection between sidewall 22 and the scuff plate 60 provides a smooth surface. Means 62 for fastening the scuff plate 60 to the overlapping panels 12' is provided in the form of at least one horizontal row of rivets (two rows being shown) preferably with low-profile heads located near the top edge of the scuff plate 60. A floor 14 is supported by a sill assembly 64 which includes transverse I-beams 66 on which floor members 68 rest. The I-beams 66 have sill plates 70 at their ends which are connected to the scuff plate 60 by rivets 72.

The overlapping panels 12' and the scuff plate 60 may be made of the same material, such as aluminum. The scuff plate is normally of a thicker gauge than the panels; however, if the scuff plate is made of a stronger material than that of the panels, for example, steel, or if the panels are made of a weaker material, for example, a plastic laminate, then the relative thickness ratio may be reversed (i.e., the panel thickness exceeds that of the scuff plate).

The scuff plate 60 may be of any height and preferably extends the length of the trailer 10. A scuff plate of unitary construction (i.e., one-piece) simplifies the assembly process of the trailer. The scuff plate may also be made of several pieces which are welded together. The scuff plate 60 serves to protect the composite panels during loading. As a fork lift moves cargo into the container, the lift truck or cargo contacts the scuff plate rather than the panel. Thus, the panels may be thin skinned with a bonded plastic or foam core.

Although the hereinbefore given description has been directed to the panels 12 of the sidewalls 22, it should be recognized that panels 12 with offset overlapping edges may also be used to provide the front wall 18 of a trailer 10 or other cargo carrier. In such an arrangement, means may be provided to allow for access in the rear (not shown) of the trailer or cargo carrier.

The offset positioning of the joint between the panels serves to protect the panels since the fastening means on the inside is recessed below the inside surface. The cargo and fork lift is therefore less likely to peel off the joint during loading and unloading. Also, preferably, the connection between the inclined portion and the major and minor portions of the inside panel members are rounded and are less likely to be engaged or torn.

The present invention may be embodied in other variant forms where the variation does not substantially differentiate from the essential novelty and uniqueness revealed in the foregoing disclosure. Reference should therefore be made to the appended claims rather than the foregoing specification, as indicating the scope of the invention. It should be understood that many modifications, variations and changes may be made without departing from the spirit and scope of the invention as defined in the claims.

What is claimed is:

1. A sidewall for a cargo container comprising:
   at least one pair of composite panels,
   joining means for joining the composite panels,
   each composite panel comprising
   (a) a planar uniform member having outer and inner surfaces,
   (b) a non-uniform member having a planar major portion parallel to the uniform member, a parallel minor portion having outer and inner surfaces, the inner surface of the minor portion abutting the inner surface of the uniform member, and an inclined portion connecting the major and minor portions, the inclined portion being angled with respect to the major and minor portions, and
   (c) a core member sandwiched between and bonded to the uniform member and the major portion of the non-uniform member, each pair of composite panels being joined by the joining means at a point where the outer surface of the uniform member of one composite panel abuts the outer surface of the minor portion of the non-uniform member of the other composite panel.

2. A sidewall for a cargo container as in claim 1 wherein the joining means comprises welding.

3. A sidewall for a cargo container as in claim 1 wherein the joining means comprises at least one rivet.

4. A sidewall for a cargo container as in claim 1 further comprising a scuff plate fastened to the composite panels.

5. A sidewall for a cargo container as in claim 4 wherein the scuff plate is of a unitary construction.

6. A sidewall for a cargo container as in claim 4 wherein the scuff plate comprises a plurality of pieces that are welded together.

7. A cargo container comprising:

a sidewall having at least one pair of composite panels, joining means for joining the composite panels, each composite panel comprising (a) a pair of members, each member having a planar major portion, a parallel minor portion having outer and inner surfaces, and an inclined portion connecting the major and minor portions of the member, the inclined portion being angled with respect to the major and minor portions of the member, the inner surface of the minor portion of one member abutting the inner surface of the minor portion of the other member, and (b) a core member sandwiched between and bonded to the pair of members, each pair of composite panels being joined by the joining means at a point where the outer surface of one of the minor portions of one of the members of one composite panel abuts the outer surface of one of the minor portions of one of the members of the other composite panel.

8. A sidewall for a cargo container as in claim 7 wherein the joining means comprises welding.

9. A sidewall for a cargo container as in claim 7 wherein the joining means comprises at least one rivet.

10. A sidewall for a cargo container as in claim 7 further comprising a scuff plate fastened to the composite panels.

11. A sidewall for a cargo container as in claim 10 wherein the scuff plate is of a unitary construction.

12. A sidewall for a cargo container as in claim 10 wherein the scuff plate comprises a plurality of pieces that are welded together.

13. A cargo container comprising:

a series of sidewall panels forming a sidewall for the container, the panels having two face members positioned adjacent one another, side edges of the two panels overlapping, at least one side edge of a first face member of at least two of the panels in the series comprising a first planar surface, a second planar surface juxtaposed to the first planar surface, and the first and second planar surfaces integrally formed with an inclined portion which communicates with the remainder of the panel, the second planar surface being offset inwardly from the first planar surface and the remainder of the panel, and means for joining the side edges ofthe at least two panels at the overlap of the second planar surfaces within their respective inward offsets.

14. A cargo container as claimed in claim 13 wherein the second face member of the at least two panels comprises a planar surface that is offset inwardly from the remainder of the panel and is joined in an abutting relation with the second planar surface of the first face member.

15. A cargo container as claimed in claim 13 wherein the at least two panels are of a composite construction having a core material positioned between the two face members, but not adjacent the inwardly offset portion.

\* \* \* \* \*